(12) United States Patent
Ponce et al.

(10) Patent No.: US 7,989,579 B2
(45) Date of Patent: Aug. 2, 2011

(54) PRODUCTION OF A FUNCTIONALIZED POLYTRIAZOLE POLYMER

(75) Inventors: Mariela Leticia Ponce, Hamburg (DE); Dominique De Figueiredo Gome, Apensen (DE); Suzana Nunes, Geesthacht (DE); Volker Abetz, Aumühle (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 447 days.

(21) Appl. No.: 12/022,237

(22) Filed: Jan. 30, 2008

(65) Prior Publication Data

US 2008/0182964 A1 Jul. 31, 2008

(30) Foreign Application Priority Data

Jan. 31, 2007 (DE) .................. 10 2007 005 666

(51) Int. Cl.
  *C08G 73/08* (2006.01)
(52) U.S. Cl. ........ 528/336; 528/337; 528/347; 528/341; 528/128
(58) Field of Classification Search .............. 528/337, 528/347, 341, 128
  See application file for complete search history.

(56) References Cited

U.S. PATENT DOCUMENTS

| | | | |
|---|---|---|---|
| 4,519,940 | A | 5/1985 | Schroeder et al. |
| 4,933,083 | A | 6/1990 | Jones, Jr. |
| 6,096,898 | A | 8/2000 | Podhorez et al. |
| 2005/0084727 | A1 | 4/2005 | Kiefer et al. |

FOREIGN PATENT DOCUMENTS

| | | |
|---|---|---|
| DE | 691 31 529 | 8/1999 |
| WO | 2004030135 A2 | 4/2004 |

OTHER PUBLICATIONS

J.R. Holsten and M.R. Lilyquist, Aromatic poly (phenylene)4-phenyl-1,2,4-triazoles, Journal of Polymer Science: Part A vol. 3, pp. 3905-3917 (1965).
Z.O. Virpsha, et al., Single-Stage Synthesis of Polytriazoles in Polyphosphoric Acid, Institute for Elemento-organic Compounds, U.S.S.R. Academy of Sciences.
E.R. Hensema, et al., Syntheses and Properties of Related Polyoxadiazoles and Polytriazoles, Journal of Polymer Science: Part A: Polymer Chemsitry, vol. 32, pp. 527-537 (1994).
Mariela Ponce et al., Sulfonated Polytriazole for Fuel Cells Applications, 1st European Chemistry Congress, Aug. 27-31, 2006—Budapest, Hungary.
K.R. Carter et al.: Synthesis of 1,2,4-triazole Poly(aryl ethers) via Heterocyclic-activated Displacement Polymerization, Macromolecules, Bd. 26, 1993, pp. 2209-2215.
EP Search Report, Application No. 08000715.6, Date Mailed Jun. 6, 2008.

*Primary Examiner* — James Seidleck
*Assistant Examiner* — Gregory Listvoyb
(74) *Attorney, Agent, or Firm* — Michaud-Kinney Group LLP

(57) ABSTRACT

A method for the production of a functionalized polytriazole polymer, particularly a poly(1,2,4-triazole)-polymer, includes the steps of (a) mixing a hydrazine salt, particularly hydrazine sulfate, with at least an aromatic and/or heteroaromatic dicarboxylic acid and/or at least a dicarboxylic acid derivate in polyphosphoric acid and if necessary further components for obtaining a solution; (b) heating the solution in a protective gas atmosphere for obtaining polyhydrazides and adding aromatic and/or heteroaromatic primary amines to the solution; and (c) precipitating a polymer. If necessary, neutralization in a basic solution may be carried out.

21 Claims, 1 Drawing Sheet

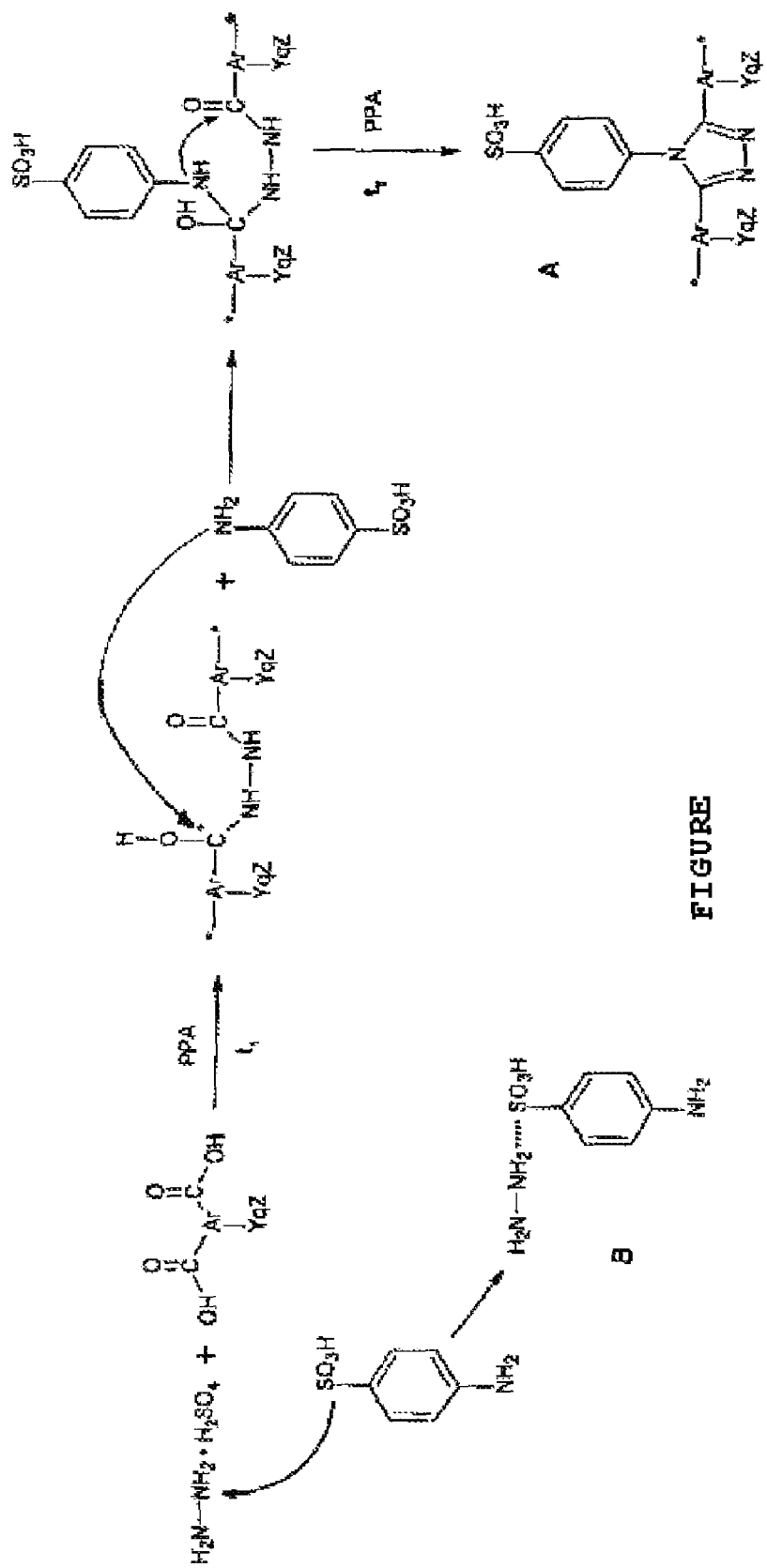
FIGURE

PRODUCTION OF A FUNCTIONALIZED POLYTRIAZOLE POLYMER

CROSS-REFERENCE TO RELATED APPLICATIONS

This application claims priority to German Patent Application No. DE 10 2007 005 666.6 filed Jan. 31, 2007, the entire disclosure of which is herein incorporated by reference in its entirety.

TECHNICAL FIELD

The present invention relates to a method for the production of a functionalized polytriazole polymer and, more particularly, to a method for the production of a poly(1,2,4-triazole)-polymer.

Further, the present invention relates to a membrane comprising the polymer and the use thereof in a fuel cell. The present invention also relates to a fiber comprising the respective polymer.

BACKGROUND

Polytriazoles find use in many and varied applications. Popular applications include the production of membranes for use in fuel cells. Polytriazoles also find applicability in the area of biocompatible implants.

Furthermore, they can be used as coating materials in a variety of different applications.

Poly(1,2,4-triazoles) are heterocyclic polymers and have been synthesized since the 1940s. Numerous synthesis procedures for polymers are known. Many of these synthesis procedures are for polymers that include 4-phenyl or 4-hydro-1,2,4-triazole-units, such polymers also being characterized by low molecular weights. Aromatic poly(4-aryl-1,2,4-triazoles) with high molecular weights, on the other hand, are primarily synthesized in two ways: According to a first method, ditetrazoles and diazidechlorides are used, leading to polymers with comparably low molecular weights. According to a second method, polymers with high molecular weights are obtained from a cyclocondensation of aniline with high molecular weight aromatic hydrazides in polyphosphoric acid (PPA).

A method according to the latter process mentioned above is described by Holsen J R, Lilyquist M R in J. Polym. Sci.: Part A Vol. 3 (1965) 3905-3917. This method describes a two-step process for the production of aromatic poly(phenylene)4-phenyle-1,2,4-triazole. Preparation of a prepolymer, an aromatic polyhydrazide, is provided by a polycondensation reaction of terephthaloyl-chloride and isophthaloyl-dihydrazide. The polytriazole first produced is cyclocondensed at temperatures between 175° C. and 260° C. with aniline in PPA. The reaction times vary between 24 hours and 140 hours. At low temperatures, a molecular weight of between 20,000 and 29,000 is realized. The highest inherent viscosities are obtained when the reaction is carried out at 175° C. for 140 hours. A shorter reaction time with higher temperatures results in polymers with lower viscosity.

Virpsha, Travnikova, Krongauz, Korshak describe the synthesis of polytriazoles in a one-step process, cf. Vysokomol. Soyed., 1969, A11/1, 69-72. This process starts with the direct production of poly-1,3,4-oxadiazoles by a reaction of a dicarboxylic acid with hydrazine sulfate. The polyoxodiazole obtained intermediately is not isolated from the reaction mixture, and aniline and PPA are added to the mixture. The mixture is heated with constant stirring. The production of polyoxodiazole occurs at temperatures between 140° C. and 180° C. in a reaction time frame between 0.5 hours and 5 hours. The polytriazoles are produced at temperatures between 215° C. and 220° C. and in a reaction time frame between 12 hours and 35 hours. The resulting polymer is insoluble in organic solvents and has a reduced viscosity between 0.42 dL/g (deciliter per gram) to 5.1 dL/g measured in sulfuric acid, wherein the values get smaller as reaction times increase. Furthermore, it is reported that residual hydrazide groups are observed.

In view of the foregoing, there is an interest in producing polytriazoles that are soluble in organic solvents and contain no residual hydrazide groups. Furthermore, with regard to the production of polytriazoles, lower reaction times, lower reaction temperatures, and resulting high molecular weights are desirable.

To date, polytriazoles have typically been produced in a one-pot process. These polytriazoles contain residual hydrazide groups and are insoluble in organic solvents. The residual hydrazide groups are a disadvantage, as they are neither thermally stable nor chemically stable. Furthermore, long reaction times, e.g., at least twelve hours, and high temperatures are necessary to produce the polytriazoles.

Polytriazoles that are soluble in organic solvents were produced in two-step synthesis procedures that require more time and high temperatures. Two polymers are synthesized in these procedures, and the resulting molecular weights are lower. Furthermore, technical difficulties arise during commercial production of polytriazoles in a two-step process.

DE 691 31 529 T2 describes a light-sensitive resin composition that is suitable for the formation of a heat resistant resin sample for use in semiconductors. The resin composition may comprise, for example, polytriazoles and is soluble in organic solvents such as N-methyl-2-pyrrolidone.

U.S. Pat. No. 4,933,083 describes a composite membrane for the separation of liquids, for example, for use in fuel cells. The composite membrane comprises polytriazoles (among other materials) and is obtained from a polymer solution with N-methyl-2-pyrrolidone.

U.S. Pat. No. 6,096,898 discloses the production of 1,2,4-triazolene in a one-pot method.

Based on the foregoing, it is an object of the present invention to produce functionalized polytriazoles in a method of short duration and with low temperatures, such polytriazoles being easily soluble in organic solvents and having high molecular weights.

SUMMARY

A method for the production of a functionalized polytriazole polymer, particularly a poly(1,2,4-triazole)-polymer, includes the steps of (a) mixing a hydrazine salt, particularly hydrazine sulfate, with at least an aromatic and/or heteroaromatic dicarboxylic acid and/or at least a dicarboxylic acid derivate in polyphosphoric acid and if necessary further components for obtaining a solution; (b) heating the solution in a protective gas atmosphere for obtaining polyhydrazides and adding aromatic and/or heteroaromatic primary amines to the solution; and (c) precipitating a polymer. If necessary, neutralization in a basic solution may be carried out.

BRIEF DESCRIPTION OF THE FIGURE

The FIGURE illustrates a chemical reaction of the present invention.

DETAILED DESCRIPTION OF THE PREFERRED EMBODIMENTS

In the present invention, a method for the production of a functionalized polytriazole polymer, particularly a poly(1,2,4-triazole)-polymer, includes the following steps:
   a) mixing a hydrazine salt such as hydrazine sulfate with at least one aromatic and heteroaromatic dicarboxylic acid and/or at least a dicarboxylic acid derivative in polyphosphoric acid and if applicable further components for obtaining a solution,
   b) heating the solution in a protective gas atmosphere for obtaining polyhydrazides and adding aromatic and/or heteroaromatic primary amines, that is amines with a primary amino group, to the solution, and
   c) precipitating a polymer.

If applicable, a neutralization step is carried out in a basic solution to eliminate an etching effect.

The mixing ratio of the aromatic dicarboxylic acids to the heteroaromatic dicarboxylic acids is preferably between 1:99 and 99:1, especially preferred between 1:50 and 50:1. These ratios are independent of the sulfonic acid content of the dicarboxylic acid.

The mixture prepared in step a) comprises especially 1 to 30 wt. %, preferably 2 to 15 wt. %, monomers for the preparation of polytriazoles.

In a preferred embodiment in step b), a first heating of the solution is carried out in a protective gas atmosphere for obtaining polyhydrazides. Aromatic and/or heteroaromatic primary amines are then added to the solution. The solution is further heated in the protective gas atmosphere to obtain polyhydrazides.

Another embodiment discloses at least a dicarboxylic acid and/or at least a dicarboxylic acid derivate comprising a structure of the formula

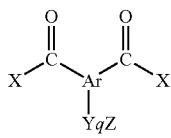

wherein Ar describes an aromatic or heteroaromatic group, particularly with substituents and/or a multi ring system, optionally with —O—, —CO—, —C(CH$_3$)—, —C(CF$_3$)—, and/or —SO$_2$— as compounds between the aromatic rings, X describes a group of the formula OR$^2$, wherein R$^2$ is a hydrogen atom or a group with 1 to up to 20 carbon atoms,
Y describes a bond or a group with 1 to up to 20 carbon atoms,
Z describes a group of the common formula —SO$_3$R$^1$ or —PO(OR$^1$)$_2$, wherein R$^1$ is a hydrogen atom or an alkali metal, and
q is a whole number between 0 and 4.

The parameter q preferably takes up the value 1.

The structures are particularly easily obtained by sulfonation of known and commonly obtained aromatic and heteroaromatic substances.

Preferably the mixture comprises at least an aromatic dicarboxylic acid and a hydrazine salt. The obtained polyhydrazide may have the following formula:

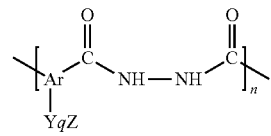

wherein n is a natural number $\geq 10$, preferably $\geq 100$.

In another preferred embodiment, the solution in step a) comprises at least an aromatic dicarboxylic acid of the group 4,4'-diphenyletherdicarboxylic acid, isophthalic acid, terephthalic acid, phthalic acid, 3-fluorophthalic acid, 5-fluoroisophthalic acid, 2-fluoroterephthalic acid, 1,4-naphthalene dicarboxylic acid, 1,5-naphthalene dicarboxylic acid, 2,6-naphthalene dicarboxylic acid, 2,7 naphthalene dicarboxylic acid, diphenic acid, ether, benzophenone-4,4'-dicarboxylic acid, bis(4-dicarboxylphenyl)sulfone, biphenyl-4,4'-dicarboxylic acid, 4-trifluoromethylphthalic acid, 2,2-bis(4-carboxyphenyl)hexafluoropropane or the C1-C20-alkylester or C5-C12-arylester thereof.

In another embodiment, the solution in step a) comprises at least a heteroaromatic dicarboxylic acid having in the aromatic ring at least an atom from the group of nitrogen, oxygen, sulfur, and phosphorus.

Preferably at least one dicarboxylic acid from the group of pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine carboxylic acid, 2,5-pyrazine dicarboxylic acid, benzimidazole-5,6-dicarboxylic acid or the C1-C20-alkylesters or C5-C12-arylesters thereof are used.

The heating in step b) is done at temperatures reaching 250° C., preferably 200° C. Particularly the heating in step b) is done at temperatures in the range of 100° C. and 190° C., particularly preferred between 150° C. and 190° C.

Preferably an inert gas is used for the protective gas atmosphere (for example, a noble gas such as argon or neon and/or nitrogen). Also a mixture of different such gases is possible.

The prepolymer in step b) is preferably obtained within a time frame of one to three hours.

Particularly advantageous is a method, wherein the aromatic and/or heteroaromatic primary amines, in particular containing a sulfonic acid group, have a structure of the following formula:

wherein Ar is an aromatic or heteroaromatic group, particularly with substituents and/or a multi ring system, optionally with —O—, —CO—, —C(CH$_3$)—, —C(CF$_3$),— and/or —SO$_2$— as bonds between the aromatic rings,
wherein Y is a bond or a group with 1 to up to 20 carbon atoms,
Z is a group of the common formula —SO$_3$R$^1$, wherein R$^1$ is a hydrogen atom or an alkali metal, and
q is a whole number between 0 and 4.

Preferably the molar ratio of the aromatic and/or heteroaromatic primary amines to the polyhydrazides obtained in step b) is essentially at 1:1. It is also advantageous when the molar ratio of the aromatic and/or heteroaromatic primary amines is essentially at 0.4 mol/150 g (moles per gram) to the amount of polyphosphoric acid.

It is particularly desirable to obtain compositions of high molecular weights.

It is also advantageous when a primary amine from the group of aniline, 4-aminobenzensulfonic acid, 3 aminobenzensulfonic acid, 4-aminopyridine, 4-fluoroaniline, 3-fluoroaniline, 4-quinolinamine and 4-bromoaniline is used.

Another embodiment of the method of the present invention provides for the first heating to take place in a temperature range between 150° C. and 170° C. and/or the further heating taking place in a temperature range between 170° C. and 190° C.

Preferably the polymer in step c) is obtained within a time frame of two to five hours.

The object of the invention is furthermore attained by a functionalized polytriazole polymer obtained by an inventive method.

The molecular ratio of nitrogen to carbon (N/C) lies in the functionalized polytriazole polymer advantageously between 0.168 and 0.175, preferably between 0.172 and 0.175.

N/C, the molar ratio of nitrogen to carbon, is mathematically determined. The conversion of oxadiazole groups into triazole rings can be determined from the N/C according to the following equation:

conversion(%)=[(N/C−0.167)/0.008]×100.

If the value for N/C is 0.167, it means that 100% of the oxadiazole reacted with a diphenylether group. Unconverted oxadiazole groups are not disadvantageous, as these groups are as stable as the triazole rings. But residual hydrazide groups are not desired, as such groups are neither thermically nor chemically as stable as oxazole groups.

Preferably, the molar ratio S/C of sulfur to carbon is between 0.018 and 0.400, particularly between 0.133 and 0.400, and particularly preferred between 0.235 and 0.400.

S/C, the molar ratio of sulfur to carbon is determined mathematically.

A particular embodiment of the invention provides for aromatic and/or heteroaromatic primary amines with at least a sulfonic acid group being used. Thus, the influence of the reaction time and reaction temperature on the ratio N/C, that is, the conversion of prepolymer into polytriazole, can be determined. Moreover, the effect of both parameters, namely, reaction time and reaction temperature on S/C, that is, the sulfonizing degree of the polytriazoles can be determined.

The molecular weight of the inventive polymer is preferably in the range of $10^5$ g/mol (grams per mole) or above.

The intrinsic viscosity of the polymer, measured in dimethylsulfoxide, is preferably between 1 and 5 dL/g, particularly preferred between 3 and 4 dL/g.

The polymer distinguishes itself by being easily soluble in aprotic polar solvents and in strong acids such as for example, sulfuric-, hydrochloric-, and phorphoric acid.

The high viscosity is brought upon especially by the high molecular weight. The polymer comprises preferably recurring triazole units with a homopolymer of the formula (I) or a copolymer of the formula (II), comprising at least two units being different from each other. The polymers can be present in the form of block copolymers (diblock or triblock), in the form of statistical copolymers, periodic copolymers, and/or alternating copolymers, wherein m is also a natural number.

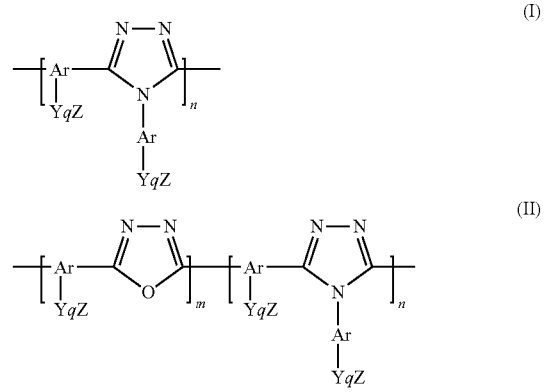

The objective is solved also by a membrane and a fiber containing the inventive polymer.

The membrane can be used advantageously in a fuel cell.

In the following, the invention is disclosed without restriction of the general inventive thought with two embodiments and with a drawing. Concerning the disclosure of inventive details not fully explained in the text, the embodiments and drawing are referred to.

Example 1

Polymer Synthesis 4,4'-diphenylether-dicarboxylic acid (DPE) and hydrazine-sulfate (HS) react for one hour at 160° C., then the reaction temperature is increased to 180° C. 4-aminobenzenesulfonic acid is added to the reaction vessel thereafter, wherein a further two hour reaction time is provided. The molar solubility rate (PPA/HS) and the molar monomer rate (HS/DPE) are kept constant at 10 and 1.2, respectively. A molar ratio of polyhydrazide, formed in situ, to 4-aminobenzenesulfonic acid of 1:1 is used. After completion of the process, the reactive medium is put into lukewarm water containing 5 wt. %/vol. sodium hydroxide solution to precipitate the polymer. The pH-value of the polymer suspension is controlled (see, for example, Gomes et al., Polymer 45 (2004) 4997-5004). In this way, a dark blue fiber is obtained, which is first cleaned in distilled water and then dried in a vacuum furnace for 48 hours at 100° C. The ratio N/C of the synthesized polymer is 0.174 and the ratio S/C is 0.058. The average molecular weight is 560,000. The average molecular weight of the polymer samples are determined with an apparatus of the type Viscotek SEC. The device supply is calibrated with standard-polystyrol by Merck, comprising an average molecular weight in the range between 309 and 944,000 g/mol. A solution with 0.05 M lithium bromide in DMAC is used as a carrier. The conversion of oxadiazole groups into triazole rings is at 88%, calculated according to the above-mentioned equation. Thus a polymer is obtained, being soluble in organic solvents such as NMP, DMSO, DMF and does not comprise residual hydrazide groups according to the TGA-FTIR-analysis.

Production of the Polymer Membrane 1 g polymer is dissolved in 14 g N-methyl-2-pyrrolidone (about 7 wt. %). The solution is stirred for 4 hours and poured on a glass plate, earlier rendered hydrophobic with octadecyl-trichlorosilane and heated to 65° C. to evaporate the solvent. After pouring, the sulfonised poly(4-aryl-1,2,4-triazole)- membrane is dried at 80° C. for 24 hours in the vacuum furnace. The thickness of the dark blue membrane is eventually 90 μm.

Example 2

Polymer Synthesis 4,4'-diphenylether-dicarboxylic acid (DPR) and hydrazine-sulfate (HS) react for three hours at 160° C., then the reaction temperature is increased to 180° C. Thereafter, 4-aminobenzenesulfonic acid is added to a reaction vessel for another two hours of reaction time. The molar solubility rate (PPA/HS) and the molar monomer rate (HS/DPE) are kept constant at 10 and 1.2, respectively. A molar ratio of polyhydrazide, formed in situ, to 4-aminobenzensulfonic acid of 1:1 is used. After completion of the process, the reactive medium is put into lukewarm water containing 5% wt./vol. sodium hydroxide solution to precipitate the polymer. The pH-value of the polymer suspension is controlled (see, for example, Gomes et al., Polymer 45 (2004) 4997-5004.) In this way, a fiber is obtained, which is first cleaned in distilled water and then dried in a vacuum furnace for 48 hours at 100° C. The ratio N/C of the synthesized polymer is 0.173 and the ratio S/C is 0.094. The average molecular weight is 230,000. The average molecular weight of the polymer samples are determined with an apparatus of the type Viscotek SEC. The conversion of oxadiazole groups into triazole rings is at 75%, calculated according to the above-mentioned equation. Thus a polymer is obtained, being soluble in organic solvents such as NMP, DMSO, DMF and does not comprise residual hydrazide groups according to the TGA-FTIR-analysis.

Production of Polymer Membrane 1 g polymer is dissolved in 14 g N-methyl-2-pyrrolidone (about 7 wt. %). The solution is stirred for 4 hours and poured on a glass plate, earlier rendered hydrophobic with octadecyltrichlorosilane and heated to 65° C. to evaporate the solvent. After pouring, the poly(4-aryl-1,2,4-triazole)-membrane containing sulfonic acid is dried at 80° C. for 24 hours in the vacuum furnace. The thickness of the dark green membrane is eventually 85 μm.

A further embodiment of the invention is depicted in the FIGURE.

The FIGURE shows two alternative mechanisms A and B for the production of a functionalized polytriazole-polymer using aromatic and/or heteroaromatic primary amines with at least one sulfonic acid group. The FIGURE shows the influence of the reaction times $t_1$ and $t_T$ on N/C, characteristic for the conversion degree of prepolymer into polytriazole, and with regard to S/C (the sulfonizing degree of the polytriazole). The first reaction time $t_1$ and the total reaction time $t_T$ are decisive factors for the values N/C and S/C. On average, the preferred reaction time $t_1$ is in the range between one and three hours, particularly between one and two hours. The total reaction time $t_T$ is preferably between 2 hours and 16 hours, more preferably between 2 hours and 11 hours, and even more preferably between 2 hours and 5 hours.

A high value for $t_1$ will be advantageous for a polymerization according to mechanism A, that is, the synthesis of poly (1,2,4-triazole) with high values for N/C and S/C. A low value for $t_1$ will in turn benefit a reaction according to mechanism B, so that both mechanisms A and B take effect at the same time and a lower value for S/C is obtained.

What is claimed is:

1. A method for the production of a functionalized polytriazole polymer comprising the steps of:
    a) mixing a hydrazine salt with at least one of a dicarboxylic acid and a dicarboxylic acid derivative in polyphosphoric acid to obtain a solution;
    b) heating the solution in a protective gas atmosphere at temperatures in a range between 150° C. and 190° C. to form polyhydrazides and adding at least one primary amine to the solution to form polytriazoles, wherein said primary amine has at least one sulfonic acid group and is selected from a group consisting of aromatic primary amines and heteroaromatic primary amines, wherein at least one of said primary amines has a structure of the formula $$H_2N—Ar—Y_qZ$$

wherein Ar is an aromatic or heteroaromatic group,
    Y is a bond or a group with 1 to up to 20 carbon atoms,
    Z is a group of the formula $—SO_3R^1$, wherein $R^1$ is a hydrogen atom or an alkali metal, and
    q is a whole number between 0 and 4; and
    c) precipitating a polymer from the solution.

2. The method according to claim 1, wherein the functionalized polytriazole polymer is a poly(1,2,4-triazole)-polymer.

3. The method according to claim 1, wherein in step a) the hydrazine salt is hydrazine sulfate.

4. The method according to claim 1, wherein in step a) the at least one of a dicarboxylic acid and a dicarboxylic acid derivative is an aromatic and/or heteroaromatic dicarboxylic acid or dicarboxylic acid derivative.

5. The method according to claim 1, wherein the step of heating the solution further comprises first heating the solution in a protective gas atmosphere for obtaining polyhydrazides, then adding said at least one primary amine to the solution and further heating the solution in the protective gas atmosphere for obtaining polytriazoles.

6. The method according to claim 1, wherein the solution in step a) comprises at least one of an aromatic dicarboxylic acid selected from the group consisting of 4,4'-diphenyletherdicarboxylic acid, isophthalic acid, terephthalic acid, phthalic acid, 3-fluorophthalic acid, 5-fluoroisophthalic acid, 2-fluoroterephthalic acid, 1,4-naphthalene dicarboxylic acid, 1,5-naphthalene dicarboxylic acid, 2,6-naphthalene dicarboxylic acid, 2,7-naphthalene dicarboxylic acid, diphenic acid, ether, benzophenone-4,4'-dicarboxylic acid, bis(4-dicarboxylphenyl)sulfone, biphenyl-4,4'-dicarboxylic acid, 4-trifluoromethyl-phthalic acid, and 2,2-bis(4-carboxyphenyl)hexafluoropropane; the C1-C20-alkylesters of any of the foregoing; and C5-C12-arylesters of any of the foregoing.

7. The method according to claim 1, wherein the solution in step a) comprises a heteroaromatic dicarboxylic acid, having in the aromatic ring at least an atom from the group of nitrogen, oxygen, sulfur, and phosphorus.

8. The method according to claim 1, wherein at least one of a dicarboxylic acid from the group consisting of pyridine-2, 5-dicarboxylic acid, pyridine-3,5-dicarboxylic acid, pyridine-2,6-dicarboxylic acid, pyridine-2,4-dicarboxylic acid, 4-phenyle-2,5-pyridine dicarboxylic acid, 3,5-pyrazol dicarboxylic acid, 2,6-pyrimidine dicarboxylic acid, 2,5-pyrazine dicarboxylic acid, and benzimidazol-5,6-dicarboxylic acid; the C1-C20-alkylesters of any of the foregoing; and C5-C12-arylesters of any of the foregoing are used.

9. The method according to claim 1, wherein the inert gas is a noble gas.

10. The method according to claim 1, wherein polyhydrazide in step b) is obtained in a time frame between one and three hours.

11. The method according to claim 1, wherein Ar comprises a multi ring system.

12. The method according to claim 11, wherein one or more of —O—, —CO—, —C(CH₃)—, —C(CF₃)—, and —SO₂— are included between the aromatic rings of the multi ring system.

13. The method according to claim 1, wherein a molecular ratio of the aromatic and/or heteroaromatic primary amines to the polytriazole obtained in step b) is essentially 1:1 and/or the molecular ratio of the aromatic and/or heteroaromatic primary amines is essentially 0.4 mol/150g to the amount of polyphosphoric acid.

14. The method according to claim 1, wherein a primary amine from the group consisting of, 4-aminobenzenesulfonic acid and 3-amino benzenesulfonic acid is used.

15. The method according to claim 5, wherein at least one of the first heating takes place in a temperature range between 150° C. and 170° C. and the further heating takes place in a temperature range between 170° C. and 190° C.

16. The method according to claim 1, wherein the polymer in step c) is obtained in a timeframe of two to five hours.

17. The method according to claim 1, further comprising a neutralization step carried out in a basic solution to eliminate an etching effect.

18. The method according to claim 1, wherein the at least one of the dicarboxylic acid and the dicarboxylic acid derivative comprises a structure of the formula

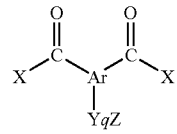

wherein Ar is one of an aromatic or heteroaromatic group,
X is a group of the formula $OR^2$, wherein $R^2$ is a hydrogen atom or a group with 1 to up to 20 carbon atoms,
Y is a bond or a group with 1 to up to 20 carbon atoms,
Z is a group of the formula —$SO_3R^1$ or —$PO(OR^1)_2$, wherein $R^1$ is a hydrogen atom or an alkali metal, and
q is a whole number between 0 and 4.

19. The method according to claim 18, wherein Ar comprises a substituent.

20. The method according to claim 18, wherein Ar comprises a multi ring system.

21. The method according to claim 20, wherein one or more of —O—, —CO—, —C(CH₃)—, —C(CF₃)—, and —SO₂— are included between the aromatic rings of the multi ring system.

* * * * *

UNITED STATES PATENT AND TRADEMARK OFFICE
CERTIFICATE OF CORRECTION

| | | |
|---|---|---|
| PATENT NO. | : 7,989,579 B2 | |
| APPLICATION NO. | : 12/022237 | |
| DATED | : August 2, 2011 | |
| INVENTOR(S) | : Ponce et al. | |

It is certified that error appears in the above-identified patent and that said Letters Patent is hereby corrected as shown below:

On the cover page (75) Inventors: please delete "Gome" and substitute --Gomes--.

Signed and Sealed this
Fourth Day of October, 2011

David J. Kappos
*Director of the United States Patent and Trademark Office*